June 5, 1923.
A. J. REISENAUER
ANIMAL POKE
Filed July 25, 1922
1,457,672
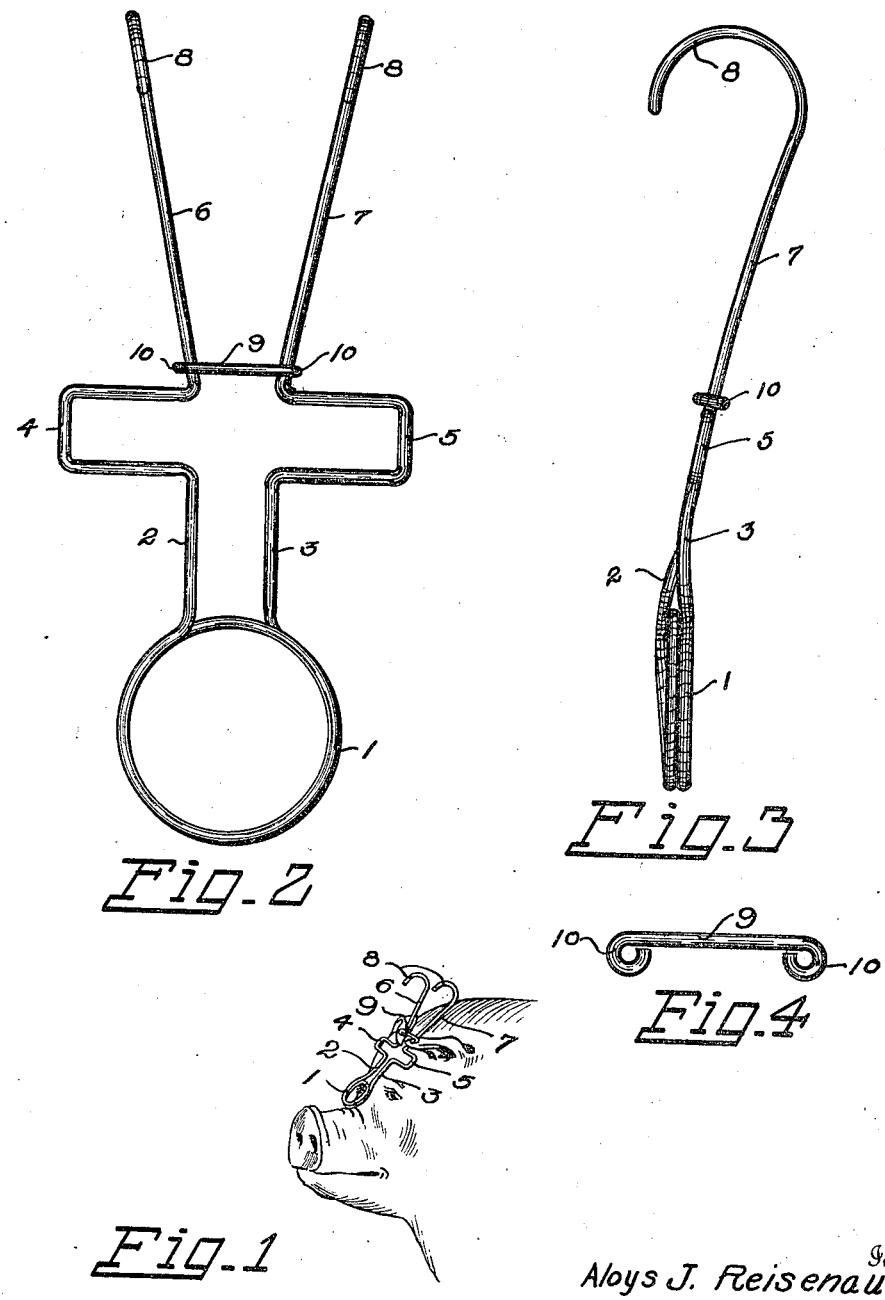
Inventor
Aloys J. Reisenauer
By Herbert E. Smith
Attorney

Patented June 5, 1923.

1,457,672

UNITED STATES PATENT OFFICE.

ALOYS J. REISENAUER, OF COLTON, WASHINGTON.

ANIMAL POKE.

Application filed July 25, 1922. Serial No. 577,303.

*To all whom it may concern:*

Be it known that I, ALOYS J. REISENAUER, a citizen of the United States, residing at Colton, in Whitman County, and State of Washington, have invented certain new and useful Improvements in Animal Pokes, of which the following is a specification.

My present invention relates to improvements in animal pokes especially adapted for use as hog yokes of the type comprising a device supported from the pierced ears of the animal and embracing means co-operating to discourage or prevent the breaking or passing through wire fences or similar barriers. The hog-tight fencing customarily employed for confining hogs is usually very expensive, and frequently it is desirable that the hogs be turned into fields not provided with such fences. By the utilization of the device of my invention the animal or animals may be turned loose in fields provided with the ordinary wire fences, thus eliminating the necessity for the more expensive fencing for the field.

The primary object of the invention is the provision of a device of simple construction that may with facility be attached to and supported from the pierced ears of the hog; which is comparatively light in weight and comfortable, but which is effective in the performance of its functions when needed.

To this end the invention consists in the novel combinations and arrangements of parts of a resilient poke or yoke furnished or fashioned of a single piece of wire, bent to the required form or shape, and provided with retaining means, as will be hereinafter more fully pointed out.

In the accompanying drawings I have illustrated one complete example of the physical embodiment of my invention wherein the parts are combined and arranged according to the best mode I have thus far devised for the practical application of the principles of my invention.

Figure 1 is a perspective view showing the device of my invention in use.

Figure 2 is an enlarged front, face, view of the poke.

Figure 3 is a side view or edge view of the device as shown in Figure 2.

Figure 4 is a detail view.

In carrying out my invention I utilize a single piece of wire, and by suitable machinery or tools fashion and form the material to the desired shape. The completed device comprises an end, comparatively flat circular loop or coil 1 from which the arms 2 and 3 extend in approximate parallelism. These arms are fashioned with oppositely disposed, lateral bows 4 and 5 of substantial rectangular shape, designed to afford a comparatively wide base or support against the forehead of the hog. In use the circular loop lies flat against the head of the hog just below the eyes and a little above the nose as shown. And the lateral bows 4 and 5, it will be seen, provide a wider and substantial support for the device to prevent turning thereof.

From the two bows, the arms diverge, and are fashioned with end portions 6 and 7, each of which terminates in a forwardly bent or rounded hook as 8. Because of the resiliency of the wire of which the device is composed, these arms 2—6 3—7 have a tendency to spread, but are retained against spreading by the presence of a transverse slide bar 9 which connects them together. The slide bar is fashioned with end eyes or rings 10, 10, which embrace the arms, and the bar may be slid, after being passed over the hooked ends, (which are drawn together for this purpose) down to the two bows 4 and 5, as seen in Figure 2. The bows form shoulders to obstruct movement of the slide bar, and the resiliency of the diverging arms because of the frictional engagement between the arms and the eyes of the bar, holds the slide bar in place on the arms when the device is not in use.

In the utilization of the poke, the ears of the hog are first pierced at predetermined points, and the hooked ends 8, which are drawn together for the purpose, are passed upwardly through the inturned ears. The slide bar is then slipped over the hooked ends of the arms, and slid down against the ears as seen in Figure 1 bringing the device to position to rest against the forehead of the hog, the coil and lateral bows hold the device in position against wabbling, and the forwardly projecting hooked ends incline upwardly in the general plane of the face of the animal lying against the retreating forehead. The vision of the hog is not obstructed, as it will be observed that the arms 2 and 3, which are brought comparatively close lie between the eyes. The animal is thus free to pursue his natural course, but it will be apparent that he will be unable to root under a fence, inasmuch as the arm sections 6 and 7 and the hooked ends thereof will engage the horizontal wire of the fence and prevent progress or advance of the animal. Strenuous exertions on the part of the hog will result in a pull on the ears and such pull will be sufficient to stop the animal.

From the above description taken in connection with my drawings it will be apparent that the device possesses simplicity, durability, and reliability, may be manufactured at comparatively slight expense, and withal is an efficient device for performing its required functions.

Having thus fully described my invention, what I claim as new and desire to secure by Letters Patent is—

1. An animal poke comprising a single piece of wire fashioned with a spring coil and diverging arms, said arms having opposed laterally extending bows and hooks at their extremities adapted to pierce the animal's ears, and means for retaining said arms against divergent opening movement.

2. An animal poke comprising a single piece of wire fashioned with a spring coil and diverging arms, hooks formed at the extremities of said arms, shoulders formed in said arms intermediate the hooks and coil, and a retaining member connecting said arms.

3. An animal poke made of a single piece of wire having an end spring-coil, diverging arms, opposed laterally extending loops in said arms, overhanging hooks at the extremities of said arms, and a bridge-bar having end eyes connecting said arms.

In testimony whereof I affix my signature.

ALOYS J. REISENAUER.